Figure 1:
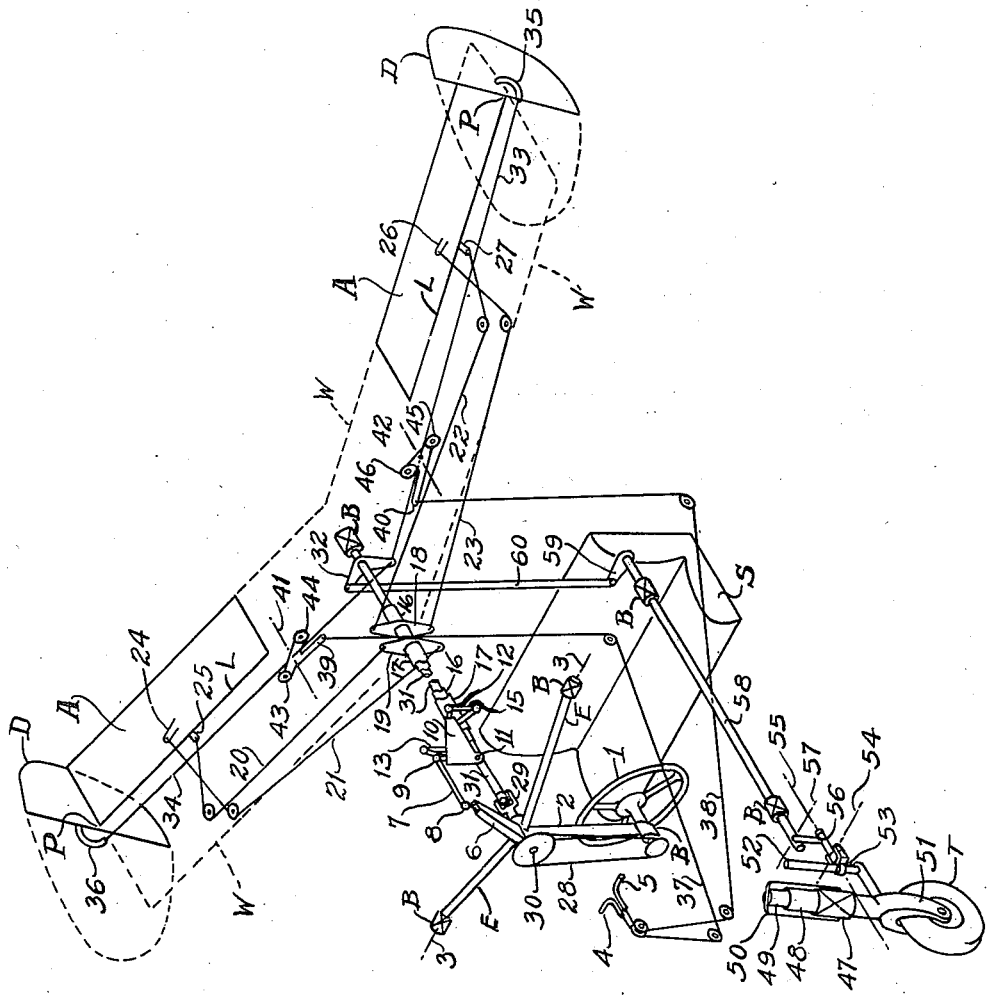

Sept. 12, 1939. W. D. WATERMAN 2,172,813
CONTROL FOR AIRPLANE VEHICLES AND GROUND STEERING GEAR THEREFOR
Filed Feb. 3, 1937 2 Sheets-Sheet 1

INVENTOR.
Waldo D. Waterman
BY *W.E.Williams*
ATTORNEY.

Sept. 12, 1939.  W. D. WATERMAN  2,172,813
CONTROL FOR AIRPLANE VEHICLES AND GROUND STEERING GEAR THEREFOR
Filed Feb. 3, 1937  2 Sheets-Sheet 2
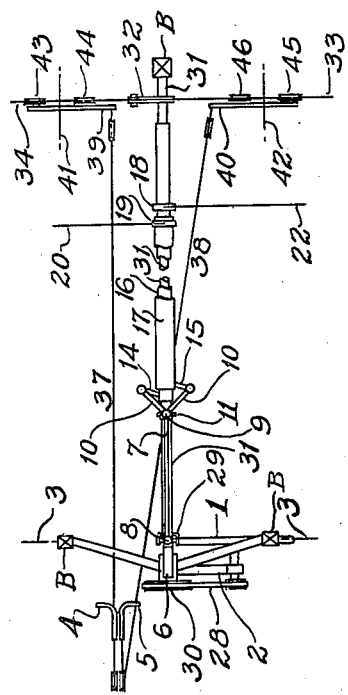
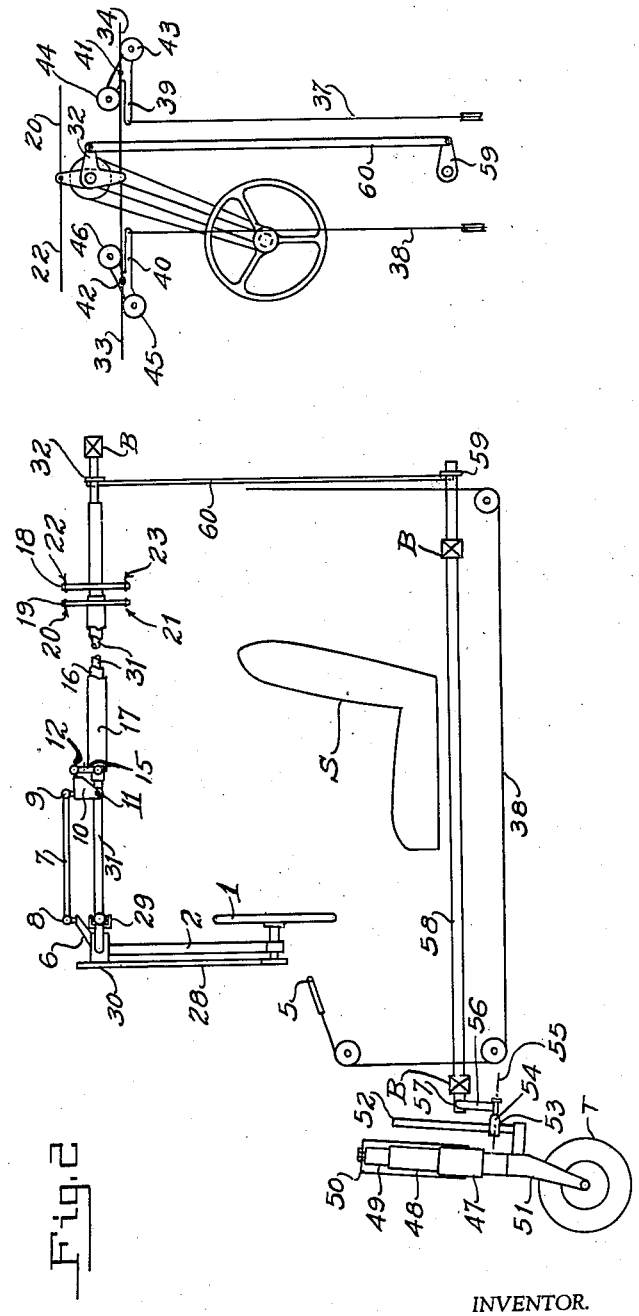
INVENTOR.
Waldo D. Waterman
BY
ATTORNEY.

Patented Sept. 12, 1939

2,172,813

UNITED STATES PATENT OFFICE 2,172,813

CONTROL FOR AIRPLANE VEHICLES AND GROUND STEERING GEAR THEREFOR

Waldo Dean Waterman, Santa Monica, Calif.

Application February 3, 1937, Serial No. 123,859

16 Claims. (Cl. 244—83)

My invention relates to improvements in controls for airplane vehicles and ground steering gears therefor. The object of my invention is to provide efficient controls adapted to any airplane vehicle and especially to the type described herein. A further object is to provide controls that may be more safely operated by those of limited skill. A further object is to provide controls to assist in landing under a type of adverse conditions as will be described herein. A further object of the invention is to provide a landing gear of special merit in taking off and in landing and at the same time adapted to be used when the vehicle is converted to be used as an automobile on the highway.

For a better understanding of the merits of the invention the following general statement is made to wit:

Most airplanes are equipped with three basic controls namely: longitudinal or pitching actuated by the fore and aft motion of the control column; lateral or banking control actuated by either the lateral movement of the control column or the rotation of a wheel mounted at the end of the control column; and direction or rotation about the vertical axis of the airplane actuated by foot-pedals.

In the normal operation of the airplane there is required a certain coordination on the part of the pilot thereof between the lateral and directional controls in order to secure the proper amount of "bank" for a given radius of turn brought about by the use of the directional control. It is possible by suitable linkage to combine the lateral and directional controls so that with the movement of one lever on the part of the pilot the proper coordination of these two controls is arranged in said linkage, provided that the aerodynamic characteristics of the airplane itself are such that it will lend itself to such an arrangement.

Such a system of control is highly desirable for an airplane to be operated by one of limited skill, as a certain amount of coordination that can only be acquired by training and experience on the part of the pilot in such a system is built into the mechanism mechanically. There is one draw-back to such a system which in the interest of safety has to be provided for. There are times when the pilot may wish a different coordination of lateral and directional control than that which is built into the mechanism, such as skidding to compensate for drift encountered in cross-wind landing or for other maneuvers involving side-slipping or skidding. It is rare that such a maneuver is necessary in the normal course of orthodox flying, but there are rare instances when such a maneuver is desirable if not imperative. A means should, therefore, be provided in the form of an auxiliary control which will make it possible for the pilot of the airplane to execute such a maneuver if the emergency arises. It may at times also be desirable to increase the total drag of the airplane such as making its flight path steeper for the purpose of shortening the landing approach. A control to accomplish this result is highly desirable.

The control described below is applicable to any type of airplane, although as particularly described it applies to an airplane of tail-less design, said airplane being briefly described as follows:

The wings of said airplane have an appreciable amount of sweep-back or retreat so that the customary ailerons, being to the rear of the center of gravity of the airplane or its aerodynamic center, may be used as both ailerons and elevators and are so linked to the control system.

In place of the customary airplane rudder there is placed near the tip of each wing a surface so hinged that it may be deflected to cause a drag, while in the neutral position it floats in the air-stream causing a minimum amount of resistance. For the purpose of this description I will refer to these surfaces as drag elements.

This invention relates to controls that may be embodied in a variety of airplane frames and housing enclosures by fitting the mechanisms into the varied frame supports without necessarily changing the mechanical elements or their equivalents or operative results.

The drawings hereof are made in diagrammatic form free from being obscured by the necessary frame supporting members.

Reference will be had to the accompanying drawings in which Fig. 1 is a perspective diagrammatic elevation of the mechanisms of the invention. Fig. 2 is a side elevation showing parts of the invention. Fig. 3 is a plan of parts described later herein. Fig. 4 is an elevation diagram of the control column looking from the rear showing details of connections therewith and indicating tension devices for wires which run to the drag elements from the handles 4 and 5.

In the diagrams S indicates the pilot's seat. The wings or planes are indicated by the dotted lines W. The ailerons are indicated by A and are shown in full lines and hinged in any suitable manner along the line L to the wings W, the hinges not being indicated. Thus the ailerons are located as it were within the area field of the wings. Drag elements indicated by D are hinged by any suitable means to the end of the wings at P.

Supporting bearings where they are indicated are marked B.

The propelling means for the vehicle may be any suitable mechanism for the purpose and is not shown or described.

The landing gear is provided with two wheels of types in use generally placed at the rear of the center of gravity of the machine or vehicle but are not shown or described herein. These wheels together with a guide or steerable wheel T as shown in the drawings compose the landing gear.

In reading Fig. 1 of the drawings the left side shows the front of the vehicle and in the operator's turning the hand wheel 1 the top of it to his left in the drawings would indicate a clockwise movement of the wheel as viewed from the front of the vehicle.

By pulling and pushing movements of the hand wheel 1 to and from the pilot seat S and revolving it on its axis together with reciprocating the handles 4 and 5 all the movements of the vehicle are controlled. Thus the use of the feet is not required as indicated by the drawings here shown.

The arrangements of these controls aim to accommodate the habit of a layman in driving an automobile, to the end that individuals who drive automobiles may more safely act as pilots in airplanes with these controls of this invention.

Assuming that the vehicle is on the field ready for a take-off and its position requires a turning movement in getting out in the clear, and this movement be made by towing or taxiing under its own propelling means, the procedure then and after in the take-off may be as follows:

If a right-hand turn is required in this movement the pilot revolves the wheel 1 counter-clockwise for this turn. The shaft of wheel 1 is supported in a bearing in a control column 2 and has fixed thereon a sprocket which drives a chain 28 which in turn drives a sprocket on shaft 30.

This shaft 30 is mounted in the upper portion of control column 2 and the column has arms E supported in bearings at their ends thus making an axis 3 on which column 2 and its connected parts are supported.

The shaft 30 is connected by a universal joint 29 the neutral axis of which is in line with the axis 3 of the column and the joint 29 is connected to a tubular shaft 31, the purpose of the tubular form being only to save weight. The outward end being at the right of Fig. 1 of shaft 31 is supported in any suitable bearing to the frame of the vehicle. Near the outer end of this shaft 31 there is fixed a crank block 32 having two arms. A connecting rod 60 is connected to one of these arms and extends down and is connected to a lever arm 59 fixed on a shaft 58 which is supported by any suitable bearings in the frame of the vehicle and extends forward to the region of the guide or steering wheel T. Fixed on shaft 58 at 57 there is an angle shaped lever 56 which is hinged at 54 in any suitable manner to a block 53 which is mounted in vertical sliding contact on a post 52. The bottom of post 52 extends over and is fixed to a castor wheel fork 51 in which is mounted the guiding or steerable wheel T.

Thus by the revolving of the hand wheel 1 by the pilot he controls the direction of travel of the vehicle when it is on the ground.

The same feature of directional control by revolving of hand wheel 1 takes place when the vehicle is in the air. This is assisted in being brought about by the mechanism connected to the lower or vertical arm of block 32 to wires 33 and 34 which are connected at their other ends to levers 35 and 36 fixed to the hinged drag members D hinged in any suitable manner at P to the ends of the wings W. Thus when a right-hand turn is made in the air the revolving of shaft 31 as described for a ground turn acts the drag element D at the end of the right wing to swing out to make resistance on that end of the wing while the drag element at the left wing remains floating in the air-stream.

However, in making a turn in the air or on the ground for that matter the revolving of the hand wheel 1 which rotates the shaft 31 as above described also rotates bodily a block 10 which is hinged by a trunnion 11 on the shaft 31, provided the block is not rotated on its trunnion. This is the case unless the control column is moved. Thus in making any turn in the air or on the ground the rotary movement bodily of block 10 with the shaft 31 brings about movements of the right and left ailerons A about their hinged connections to the wings lifting one aileron and lowering the other as well as deflecting the drag element on the side towards which it is desired to turn, bringing about a banking and turning movement. This reverse directional movement of the ailerons is only required in making a turn or bank and can only be produced in this system of control by the revolving of the hand wheel 1. This feature is desirable from the standpoint that one accustomed to driving an automobile may make his turns either on the ground or in the air in the same habit used in a road vehicle.

The mechanism which provides the connections of shaft 31 to bring about the movements of the ailerons above mentioned is composed of the block 10 being connected by universal joints 12 and 13 to lever arms 14 and 15. The arm 14 is fixed to a hollow shaft 16 telescoping over shaft 31 and the lever arm 15 is fixed to a hollow shaft 17 telescoping over the shaft 16. On shaft 16 there is fixed a block 18 having upper and lower lever arms. The upper arm is connected to a wire 22 which is trained around a suitable sheave and is connected to a lever arm 27 fixed to the lower side of the left aileron A of the vehicle. The lower arm of block 18 is connected to a wire 23 trained around and connected to a lever 26 on the before mentioned left aileron. Thus by rocking the shaft 16 the left aileron is controlled in its hinged movements to the wing. On the shaft 17 there is fixed a block 19 similar to block 18 and the upper arm of the block 19 is connected by a wire 20 trained around and connected to a lever arm 25 on the under side of the right aileron A. The lower arm of block 19 is connected by a wire 21 that extends to and is fixed to a lever arm 24 on the right aileron whereby the rocking motion of the block 19 moves the right aileron up and down about its hinged connection to the right wing.

The movements of the two ailerons in unison to produce the elevation or descent of the vehicle is produced by swinging the control column 2 about its axis 3. This is accomplished through the lever arm 6 which is connected to the column 2 and by universal joint 8 connecting it to a rod 7 which in turn is connected by universal joint 9 to the block 10. Thus when the pilot pushes or pulls the hand wheel 1 to and from himself he rocks the block 10 about its trunnion 11 and in doing this he raises and lowers both of the ailerons in unison through the connections previously described to the block 10. Thus in an ascending or a descending flight the pilot merely moves the hand wheel 1 to and from himself without turning it, but if he wishes to bank or turn he will revolve the hand wheel 1 in any position which he at the same time swings the column 2 whereby the combined movements of the hand wheel 1 and the column 2 bring about any control movement desired for the vehicle.

In a situation involving skidding or other emergency or a steep descent whereby the speed of the airplane is desired to be slowed down as it were by a braking action the pilot will grasp with one hand both the handles 4 and 5 which are connected by wires 37 and 38 to lever arms 39 and 40, which arms are hinged at 41 and 42 in any suitable location in the airplane whereby sheaves 45 and 46 and 43 and 44 are astride of the respective wires 33 and 34 that will permit them on the movement of the arms 39 and 40 under the pull of wires 37 and 38 from the handles 4 and 5 to exert a shortening effect of wires 33 and 34 which then act to swing the drag elements D out into the air-stream to act as a brake on the speed of the vehicle. In some more or less critical situations of skidding, banking or other emergency the pilot may pull on either handle 4 or 5 to control either drag element as needed at the time or occasion.

The vehicle is provided with two landing gear wheels located at the rear of the center of gravity of the vehicle as desired for landing purposes, but these are not thought necessary to show or describe in this association of mechanism. However, the guide or steerable wheel T is shown and is provided with a shock absorbing mechanism. The castor wheel fork 51 has a cylindrical extension held in sliding relation in a bearing block 47 fixed to the frame of the vehicle. This cylindrical extension is indicated by 48 and is provided with a hollow cavity on the inside in which there is an elastic shock absorbing element contacted by a plunger 49 held to the block 47 by a clevis strap 50.

In the drawings the control mechanisms that are shown above the pilot seat may be reversed and located beneath the pilot's floor when desired but retaining the position of handy access of those parts needed to be moved by the pilot's direct contact. The action upon the drag elements and through the handles 4 and 5 or either one alone does not prevent the control by hand wheel 1 also acting on said drag elements in the normal way.

What I claim is:

1. In a vehicle of the class described, the combination with a control column provided with transverse shaft bearings near each end, of means for pivotally supporting said column near one end, a shaft having an operative hand wheel mounted in the bearing at the free end of said column, a second shaft provided with a universal joint mounted in the second of said bearings, means for transmitting motion from the hand wheel to the second shaft, a horizontal shaft coupled to the universal joint, a trunnion on said horizontal shaft, a block mounted on said trunnion, linkage connecting said block to the control column whereby the rotative position of the block is controlled by the swinging of the column, a crank block also fixed on said horizontal shaft provided with arms adjacent to one end, wings for supporting said vehicle in flight, a drag element hinged at the outer end of each wing provided with a lever arm, wires connecting each drag member to the outer end of a lever arm, a connecting rod, a landing wheel control shaft provided with a lever arm, said connecting rod joining said last lever to said arm on said crank block, a guide steering wheel and means for directing it by said landing wheel control shaft, a hollow shaft surrounding said horizontal shaft provided with two oppositely extending lever arms, an aileron provided with two lever arms extending in different directions from the axial plane thereof hinged to one of said wings, wires connecting said arms on the hollow shaft to the arms on the aileron, a second hollow shaft telescoped over the first one and provided with a block having two radially extending arms, a second aileron corresponding to the first one hinged to a second wing, wires connecting arms on said second aileron to arms on said second hollow shaft, and suitable levers and linkage connecting said control column to said hollow shafts by means of which said shafts may be oscillated by a fore and aft motion of the control column, whereby directional control of the vehicle is provided by revolving said hand wheel and elevation and descent control is provided by the fore and aft swinging of the control column.

2. In a vehicle of the class described, the combination with a cabin, of a wing extending laterally and in a retreating sweep-back alignment from two opposite sides of said cabin, a drag element hinged at the outer end of each of said wings, hand wheel operated means for selectively moving either of said drag elements, and emergency means for optionally selectively moving either or both of said drag elements.

3. In a vehicle of the class described, the combination with a cabin, of a wing extending laterally and in a retreating sweep-back alignment from two opposite sides of said cabin, a drag element hinged at the outer end of each of said wings, hand wheel operated means for selectively moving said drag elements into the airstream for brake purposes, an emergency means for selectively moving either or both of said drag elements, and a steerable guide wheel operatively connected with said hand wheel.

4. In a vehicle of the class described, a control mechanism comprising a control column provided with parallel shaft bearings adjacent to each end, supporting bearings adjacent to one end of said column having an axis transverse to that of the adjacent shaft bearing, a shaft provided with a universal joint in one of said first shaft bearings, a second shaft in the other of said first shaft bearing, a hand wheel coupled to said second shaft, means for transmitting rotary motion from said hand wheel to said first mentioned shaft, a horizontal shaft coupled to said universal joint, telescoping tubes on said horizontal shaft, a plurality of lever arms extending radially from said horizontal shaft mounted on said tubes and rigidly connected thereto, two ailerons each of which is hinged to an airplane wing and is provided with diverging fixed lever arms, wires connecting said aileron arms to said shaft lever arms, and means connected to said tubes and said control column for simultaneously changing the angular direction of both ailerons by rocking the control column.

5. In a vehicle of the class described provided with wings having retreating swept-back ends, a drag element hinged at the outer end of each of said wings and adapted to normally float in the airstream, a lever arm on each of said drag elements, flexible means connected to the free ends of said lever arms and to suitable steering means, tension devices mounted astride said flexible means, an operative wire for each of said tension means adapted to shorten a corresponding flexible means, and a grasping handle for each operative wire.

6. A vehicle of the class described provided with rearwardly inclined wings, a drag element hinged at the free end of each wing adapted to float in the airstream, a rigidly connected lever arm on each drag element, a wire connected to each lever, a tension device mounted astride of each of said wires, an operative wire for each tension device, a handle connected to the free end of each operative wire, means for supporting said handles which enables a pilot to grasp either or both handles for selectively moving either or both of said drag elements for steering or braking.

7. A vehicle of the class described provided with control means, comprising a control column provided with parallel terminal bearings, a shaft carried in one of said bearings and provided with a universal joint, means for supporting said column near said shaft to oscillate on an axis transverse to the fore and aft axis of the vehicle, a driven shaft coupled to said universal joint, a pivoted block on said driven shaft, lever arms connected with the ailerons, a connection between said block and said control column, and means connecting said block and said lever arms whereby a rocking of the control column operates the ailerons in the same direction while a rotation of said driven shaft operates the ailerons in opposite directions.

8. In a vehicle of the class described, the combination with a control column mounted to swing on an axis transverse to the fore and aft axis of the vehicle, of a shaft having a trunnion and a rotatable block fixed thereon, link and lever means connecting said block to said control column, a hollow shaft concentric with said first shaft, a second hollow shaft telescoped over said shafts, link and lever means connecting said block to oscillate said tubular shafts in opposite directions, a block having oppositely extending lever arms mounted on each tubular shaft, ailerons provided with lever arms extending from opposite faces hingedly supported at their forward edges, wires connecting the lever arms on said blocks with the lever arms on said ailerons, hingedly supported drag members having means for attaching tension members, a lever arm rigidly attached to said first shaft, wires connecting the latter arm to said drag members, a tension device mounted astride each of said wires to said drag members, a pair of handles mounted to be grasped singly or together, and suitable wires connecting each handle to a corresponding tension device.

9. A control mechanism for a vehicle of the class described comprising a control column mounted to swing about an axis, a manually driven shaft having a rotatable block fixed thereon by means of a trunnion, link and lever means connecting said block to said column, two concentric tubular shafts telescoped over said first shaft, radial levers mounted on said shafts, means for oscillating said tubular shafts in opposite directions, one or more wings, ailerons hinged to said wings and provided with levers extending on opposite sides, wires connecting said aileron levers to the levers on said tubular shafts, a drag element provided with an operating lever hinged to each free end of said wings, wires connecting each drag lever to said lever on said central shaft, a tension device astride each wire to said drag levers, a pair of handles adapted to be grasped singly or together, and wires connecting each handle with a tension device.

10. In a vehicle of the class described, the combination with a control column provided with a transverse shaft bearing at each end, supporting means for said column permitting it to be oscillated, a shaft mounted in one of said bearings having a universal joint and radial lever arms, drag elements provided with hinged supports, wires connecting drag elements to one of said lever arms, two concentric tubular shafts provided with levers telescoped over a portion of said first shaft, a trunnion on said first shaft, a block hinged to said trunnion, levers and linkage connecting said block with said tubular shafts, linkage connecting said block with the control column, ailerons provided with hinged supports and outwardly extending levers, a wire connecting a lever arm on one tubular shaft with a lever on one aileron, a second wire connecting a companion lever on said shaft to the companion lever on the aileron, wires connecting companion lever arms on said second tubular shaft to lever arms on a second aileron.

11. In a vehicle of the class described, the combination with one or more stationary wings, of a drag element hinged at the ends of said wing or wings each provided with a lever arm, means for selectively pulling said elements out of neutral position, wires connecting said lever arms with said pulling means, two tension producing devices adapted to shorten said wires and thereby move the attached drag elements in opposite directions into the airstream, whereby said vehicle may be steered by pulling on one drag element or may be braked by simultaneously swinging both drag elements into the airstream by means of said tension producing devices.

12. In a vehicle of the class described provided with wings, a controlling means comprising two drag elements each provided with a lever arm and hinged at an end of a corresponding wing, means for moving said drag elements out of neutral floating position into the airstream, tension wires connecting said latter means to said lever arms, a tension producing device mounted on each of said wires adapted to crimp the latter and thereby swing a corresponding drag element out of the airstream for braking or banking purposes, two handles adapted to be grasped by a pilot, and wires connecting each of said handles with a corresponding tension producing device.

13. In a vehicle of the class described, a control column provided with a transverse shaft bearing and supporting arms extending transversely from the body thereof and inclined thereto, bearings for the ends of said supporting arms, a shaft extending transversely of the arms and mounted in said bearing in the control column, a horizontal shaft, a universal joint coupling said shafts with its neutral axis in the line of the axis of the bearings of said arms means upon said horizontal shaft for operating the ailerons in opposite directions and means cooperating with said last named means and said control column for operating the ailerons in the same direction.

14. A vehicle of the class described provided with rearwardly inclined wings, an aileron hinged to each wing, a drag element hinged to an outer end of each wing about an axis substantially perpendicular to the main axis of the wing, manually operated means including a hand wheel for changing the position of each aileron and emergency means for selectively turning each drag member into operative position or simultaneously turning both of said members.

15. A control for airplanes comprising a pivoted control column, a shaft, means controlled by the operator for rotating said shaft, a block fulcrumed on said shaft, means connecting said control column and said block for pivoting said block and means connecting the ailerons to said block whereby a rotative movement of said block will operate said ailerons in opposite direction while a pivoted movement of said block will operate said ailerons in the same direction.

16. A control for airplanes comprising a pivoted control column, a shaft rotatably mounted in said control column at one end thereof, means under the control of the operator for rotating said shaft, a block pivotally connected to said shaft telescoping tubes upon said shaft, pivoted lever connecting said block to said telescoping tubes means connecting said telescoping tubes to the ailerons and a connection between said column and said block for pivoting the same whereby said ailerons may be operated in opposite direction or in the same direction.

WALDO DEAN WATERMAN.